No. 789,912. PATENTED MAY 16, 1905.
G. W. HOLMAN.
ADJUSTABLE MEAT SUPPORT.
APPLICATION FILED FEB. 9, 1905.
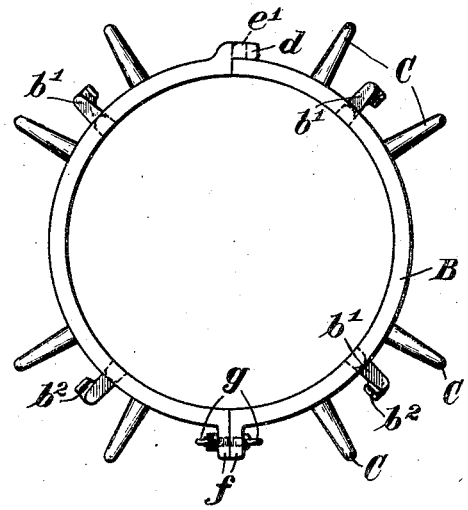
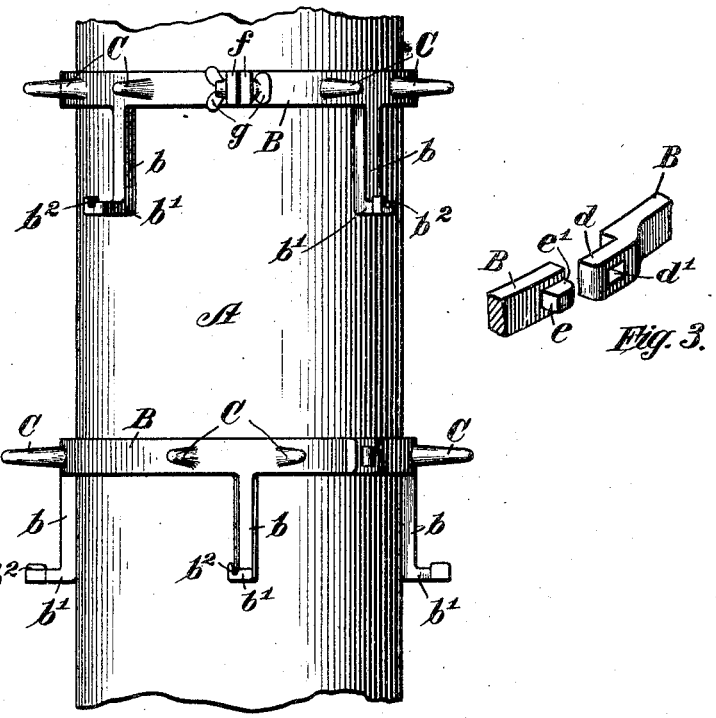
Witnesses:
Inventor
George W. Holman,
By
Attorney No. 789,912. Patented May 16, 1905.

UNITED STATES PATENT OFFICE.

GEORGE W. HOLMAN, OF ALLIANCE, OHIO.

ADJUSTABLE MEAT-SUPPORT.

SPECIFICATION forming part of Letters Patent No. 789,912, dated May 16, 1905.

Application filed February 9, 1905. Serial No. 244,906.

*To all whom it may concern:*

Be it known that I, GEORGE W. HOLMAN, a citizen of the United States, residing at Alliance, in the State of Ohio, have invented certain new and useful Improvements in Adjustable Meat-Supports, of which the following is a specification.

The invention to be hereinafter described relates to adjustable meat-supports of the general type adapted to support various cuts of meat in cold storage or for displaying the same in markets, provision-stores, and the like.

The object of the present invention is to provide a combined meat hook and rest of simple and efficient construction and which may be readily adjusted to different positions on its supporting-standard to accommodate cuts of meat of varying size and character.

With these general objects in view the invention consists of the parts and combinations which will be hereinafter described and then definitely pointed out in the claims.

Figure 1 is a plan view of an adjustable meat-support detached from its standard or carrying-cylinder. Fig. 2 is a side elevation of a standard or cylinder with two improved meat-supports secured thereto in adjusted position, parts of the standard being broken away at the top and bottom; and Fig. 3 is a detached detail end lock for uniting the two parts of the meat-support, said parts being on an enlarged scale.

In the drawings, A represents a standard or cylinder of any usual or preferred construction and which, as is sometimes desirable, may be rotatively mounted. At varying distances apart the standard is provided with a meat-support B, each of which in the form of invention here shown is semicircular in general outline, and said semicircular portions are united by means presently to be described. Projecting downward from each of the supports B are the hooks $b$, preferably formed integral or cast with the semicircular portions and provided at their lower extremities with an outturned foot $b'$, which is itself provided with the side projecting hook $b^2$.

Disposed upon the semicircular portions of the meat-support are the rests C, one on each side of the downwardly-projecting hooks $b$. These rests C may preferably be cast integral with the semicircular portions of the meat-support in a similar manner to the formation with the downwardly-projecting hooks $b$ and extend radially from the semicircular portions a greater distance than the parts $b$ of the hooks, whereby meat hung upon the hooks will have portions thereof contacting with the rests C to prevent the meat from swinging or vibrating to an undesirable extent when the standard or cylinder is moved. These rests C also serve to keep the meat which is hung upon the hooks from contacting with the cylinder or standard A, thus serving to maintain the said standard or cylinder A clean.

The semicircular portions of the meat-support, which, as above set forth, are separately formed, are provided with means whereby they may be united and adjustably secured upon the standard A to accommodate the size and character of the meat to be sustained and also to vary the stock-holding capacity of the standard or cylinder A by placing more or less of these meat-supports about the same. One of the semicircular portions B, as shown in Fig. 3, is provided with a projecting lug $d$, which is offset somewhat from the main body of the support and is provided with an angular opening $d'$. The opposite or coacting semicircular portion of the meat-support has at its end a lug $e$, having a rounded end $e'$, which is adapted to engage the opening $d'$ on the other semicircular member to unite the ends thereof. The other end of each semicircular member is provided with the projecting lug $f$, Figs. 1 and 2, which may be joined by a screw or bolt $g$ of usual construction, whereby the semicircular portions may be fitted to and secured firmly upon the standard or cylinder A in adjusted position.

From the above construction it will be noted that each of the two meat-supports is formed of two semicircular members, one end of each member being provided with a portion of a lock, and the other end of each member has a tightening means uniting the same, whereby the meat-support may be readily adjusted vertically upward or downward upon the sustaining standard or cylinder A, according to the character and size of the cut of the meat to be supported. To adjust the meat-supports, it is only necessary to loosen the screw or bolt $g$, turn the two semicircular members slightly away from each other, they moving at such times on their engaging pins $e'$ and slots $d'$, then raising or lowering the loosened meat-support and when in desired position tightening the same about the standard by means of the screw or bolt $g$. Thus swinging apart of the two semicircular members of the meat-support is rendered possible by the curved portion $e'$ of the lug $e$, as hereinbefore fully described.

It will be obvious, of course, that the shape of the meat-support may be varied to conform to the character of the standard on which it is mounted or is intended to be adjusted and that by varying the distances apart of the meat-supports, as hereinbefore indicated, the support capacity of the standard A may be increased or diminished and the meat-supports disposed so as to more definitely carry and sustain the particular cuts of meat hung upon them. It will also be obvious that the rests C by engagement with the portion of the meat hung upon the hooks will prevent the meat from engagement against the standard, thereby soiling or greasing the same.

Having thus described my invention, what I claim, and desire to secure by Letters Patent, is—

1. The combination of a standard, a meat-support adjustably secured thereto, said support comprising two parts, each provided with downwardly-projecting hooks, a meat-rest projecting outwardly from the parts of said meat-support on opposite sides of each of said hooks, means for locking the two parts of the meat-support at one end, and means for adjustably securing the other ends of the two parts of the support, substantially as described.

2. The combination of a standard, a meat-support embracing the same and adjustable thereon, a series of hooks extending downward from said support and provided at their lower ends with outturned feet and side projecting hook portions, a series of meat-rests projecting outwardly from the supports, one on each side of the hooks, said meat-rests serving to engage portions of the suspended meat and prevent contact thereof with the standard.

3. The combination of a standard, a meat-support formed of two parts, a lock to connect adjacent ends of said parts, an adjusting-screw connecting the other ends of said parts to tighten the parts about the standard in adjusted position, a series of downwardly-projecting hooks extended from said two parts, and a series of meat-rests projecting outwardly from said parts at each side of each hook.

4. A meat-support comprising two semicircular portions, each of said portions being provided with downwardly-projecting hooks provided at their lower ends with outturned feet and side projecting hooks, and meat-rests projecting from the semicircular portions on each side of the downwardly-projecting hooks.

5. A meat-support comprising two semicircular portions, one end of one of said portions being provided with an offset and opening, one end of the other of said portions being provided with a lug having a rounded end to engage said opening in the offset, a bolt or screw for joining the other ends of said portions, hooks extending downward from each of said portions, and meat-rests projecting from said portions at each side of said downwardly-projecting hooks.

In testimony whereof I affix my signature in presence of two witnesses.

GEORGE W. HOLMAN.

Witnesses:
W. J. TUTERS,
WM. M. ROACH.